Dec. 26, 1961  L. D. GOFF ET AL  3,014,697
DEVICE FOR EXTRACTING ROCKS AND OTHER OBJECTS
WEDGED BETWEEN THE WHEELS OF
DUAL WHEELS OF VEHICLES
Filed April 8, 1960
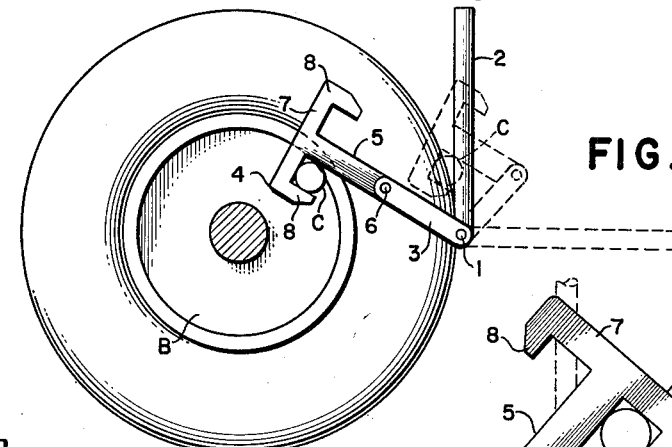
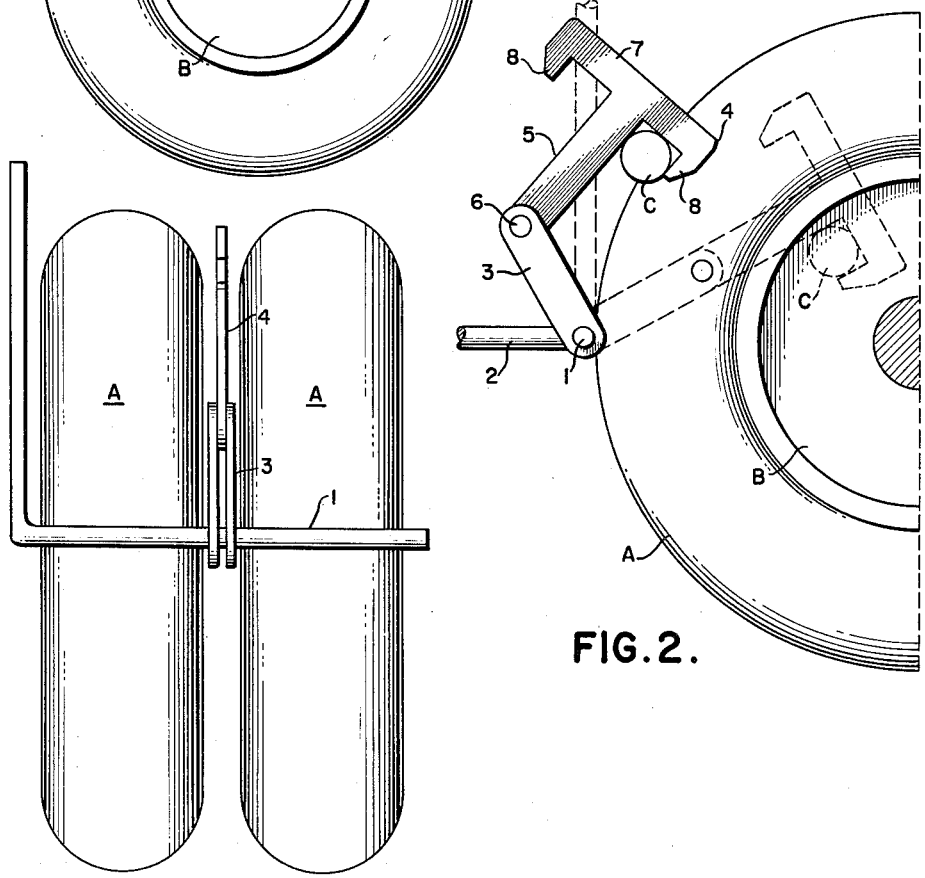
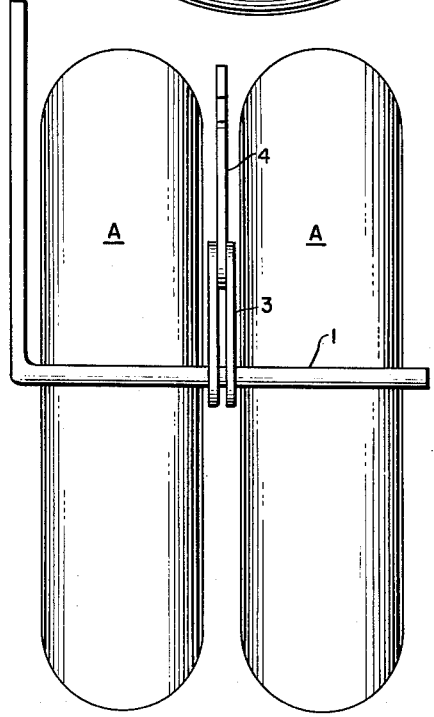
FIG. 1.
FIG. 2.
FIG. 3.
INVENTORS
Leland D. Goff &
John F. Thomas
BY George M. Anderson
ATTORNEY United States Patent Office 3,014,697
Patented Dec. 26, 1961

3,014,697
DEVICE FOR EXTRACTING ROCKS AND OTHER OBJECTS WEDGED BETWEEN THE WHEELS OF DUAL WHEELS OF VEHICLES
Leland D. Goff, 1645 Springbrook Road, Medford, Oreg., and John F. Thomas, Glendale, Oreg.
Filed Apr. 8, 1960, Ser. No. 20,988
2 Claims. (Cl. 254—113)

The invention relates to means for extracting rocks and other objects wedged between the dual wheels of vehicles. Such objects are difficult to extract and no satisfactory device has hitherto been devised to extract them.

An object of the invention is to provide a satisfactory device for this purpose which is simple in construction and economical to manufacture.

Other objects and advantages will appear hereinafter or will be obvious.

The invention consists in the novel construction and combination of parts hereinafter set forth in the claims.

In the accompanying drawings,

FIGURE 1 is a side view of the invention as applied and engaged with the "object" prior to extraction thereof;

FIGURE 2 is a view similar to FIGURE 1, partly broken away and on a larger scale, showing the invention engaged with the "object" after its extraction, this view being taken from the side of the vehicle opposite to that side from which FIGURE 1 was taken;

FIGURE 3 is a front view of the invention as applied.

Referring to the drawings, 1 designates a straight rod, positionable transversely of and having a length to extend transversely across the rubber tires A of said wheels B, said rod having at one end thereof a crank handle 2, and intermediately of its length a radial crank arm 3, said rod and said radial crank arm together constituting a lever.

Said radial crank arm 3 is provided with a T-shaped hooked member 4, the stem arm 5 of which is at its inner end pivotally connected with said radial crank arm at 6, the transverse arm 7 of said hooked member having at each end thereof a hook 8, either hook 8 being hookable over and below said object C, depending upon which side of the vehicle the device is used.

Said lever is fulcrumable upon the peripheries of the rubber tires of the dual wheels through the medium of said rod 1, and upon operation of said lever by means of said crank handle, said lever, through the medium of said hooked member, is adapted to exert pressure against said object C to extract it and to simultaneously exert pressure upon said rod against the peripheries of the rubber tires of said wheels to indent said tires and thereby establish the fulcrum of said lever in the indentation.

Obviously the hooked member 4 may be provided with only one hook 8, instead of the two shown in the drawings. However it is best to have said member provided with two hooks in order that the device may be used upon either side of the vehicle.

The device may be made sturdy enough to resist the twisting strain upon said rod in the operation of said lever by means of its crank handle.

We claim:

1. A device for extracting rocks and other objects wedged between the wheels of dual wheels of vehicles, comprising a straight rod positionable transversely of and having a length to extend transversely across the rubber tires of said wheels, said rod having at one end thereof a crank handle and intermediate of its length a radial crank arm, said rod and said crank arm together constituting a lever, said radial crank arm having a hooked member pivotally connected thereto provided at its outer end with a hook hookable over and below said object for extracting the object upon operation of said lever, said crank arm and said hooked member being insertible between said wheels, said lever being fulcrumable upon the peripheries of said rubber tires through the medium of said rod and upon operation thereof being adapted to exert pressure of said hooked member against said object to extract it and to simultaneously exert pressure of said rod against the peripheries of said rubber tires to indent said tires and establish the fulcrum of said lever in the indentation.

2. A device for extracting rocks and other objects wedged between the wheels of dual wheels of vehicles, as defined in claim 1, in which said hooked member is T-shaped, the stem arm of which is pivotally connected to said crank arm and the transverse arm of which has at each end thereof a hook, either hook being hookable over and below said object depending upon which side of the vehicle the device is used.

References Cited in the file of this patent
UNITED STATES PATENTS
1,494,951    Cragun _____ May 20, 1924